(12) United States Patent
Schmidt et al.

(10) Patent No.: US 6,462,700 B1
(45) Date of Patent: Oct. 8, 2002

(54) ASYMMETRICAL MULTI-BEAM RADAR SENSOR

(75) Inventors: Ewald Schmidt, Ludwigsburg; Bernhard Lucas, Besigheim; Thomas Beez, Weinsberg, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/857,563

(22) PCT Filed: Sep. 27, 2000

(86) PCT No.: PCT/DE00/03399

§ 371 (c)(1),
(2), (4) Date: Sep. 6, 2001

(87) PCT Pub. No.: WO01/26183

PCT Pub. Date: Apr. 12, 2001

(30) Foreign Application Priority Data

Oct. 6, 1999 (DE) .......................................... 199 48 025

(51) Int. Cl.$^7$ ............................................... G01S 13/00
(52) U.S. Cl. ................... 342/70; 342/175; 343/700 MS
(58) Field of Search ............................. 342/70, 71, 72, 342/175; 343/700 MS, 720, 725, 753, 761, 781 CA, 785, 909, 911 R

(56) References Cited

U.S. PATENT DOCUMENTS

| | | | | |
|---|---|---|---|---|
| 4,769,646 A | | 9/1988 | Raber et al. ................ 343/753 |
| 6,028,560 A | * | 2/2000 | Pfizenmaier et al. ........ 343/753 |
| 6,037,894 A | * | 3/2000 | Pfizenmaier et al. .......... 342/70 |
| 6,075,492 A | * | 6/2000 | Schmidt et al. ............. 343/753 |
| 6,320,553 B1 | * | 11/2001 | Ergene ....................... 343/781 |
| 6,366,245 B1 | * | 4/2002 | Schmidt et al. ...... 343/700 MS |

FOREIGN PATENT DOCUMENTS

| | | |
|---|---|---|
| DE | 195 43 813 | 5/1997 |
| DE | 197 14 578 | 11/1998 |
| EP | 0 498 524 | 8/1992 |
| EP | 0 755 092 | 1/1997 |
| WO | WO 97 02496 | 1/1997 |

OTHER PUBLICATIONS

* Spencer, D.G., "Novel Millimeter ACC Antenna Feed", IEEE Colloquum On Antennas For Automotives, Mar. 10, 2000.

* cited by examiner

Primary Examiner—John B. Sotomayor
(74) Attorney, Agent, or Firm—Kenyon & Kenyon

(57) ABSTRACT

A multi-beam radar sensor having at least two transmitting/receiving patches, in which the patches, assigned polyrods, and/or a dielectric lens are configured so as to be asymmetrical. As a result of this asymmetrical arrangement, asymmetrical beam paths result for the transmitting and receiving beams. These asymmetrical beam paths cause the average error amount in the angle measurement of the radar sensor to be less than in the case of a symmetrical arrangement.

10 Claims, 5 Drawing Sheets

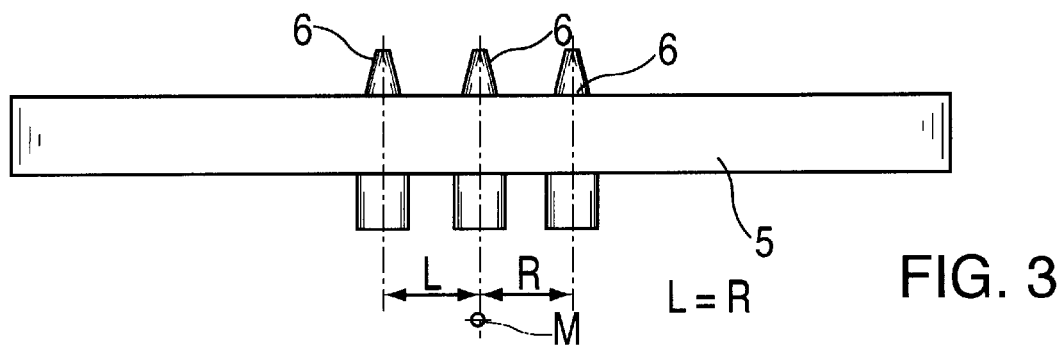
FIG. 3  L = R
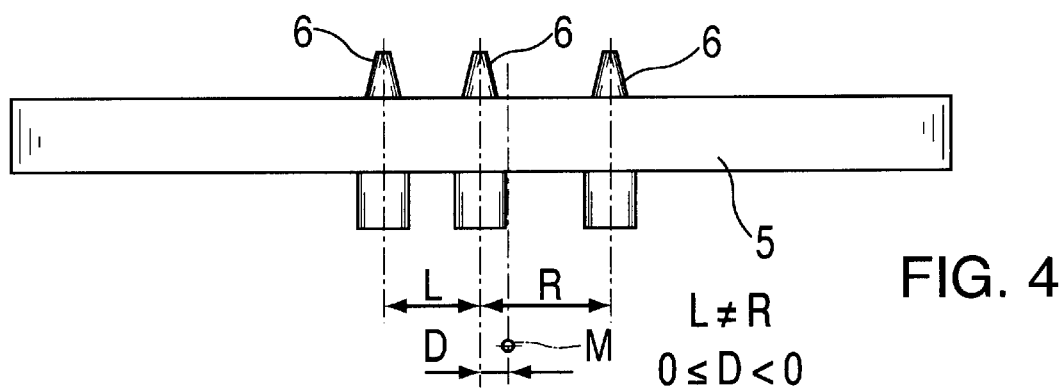
FIG. 4  L ≠ R  0 ≤ D < 0
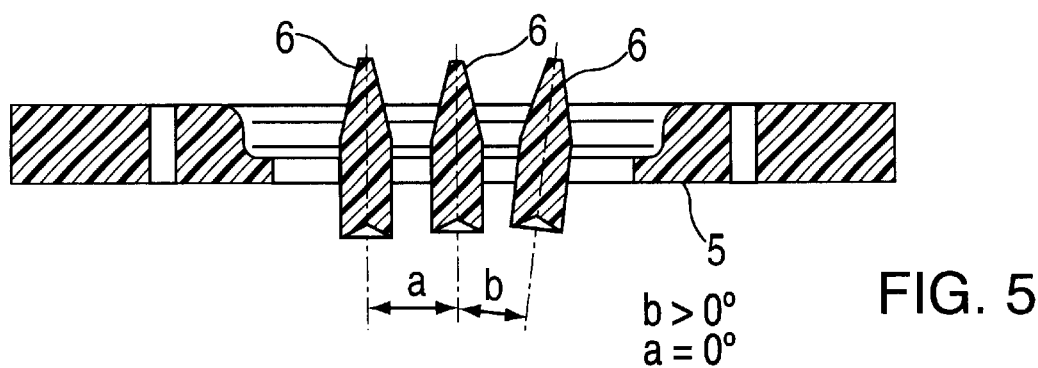
FIG. 5  b > 0°  a = 0°
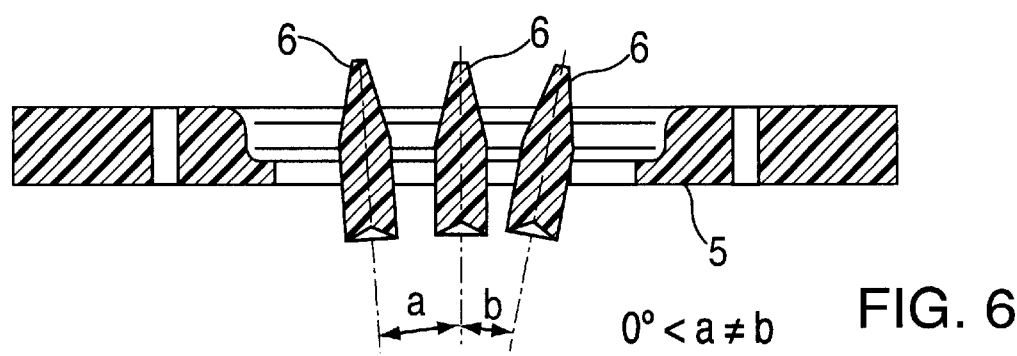
FIG. 6  0° < a ≠ b

ASYMMETRICAL MULTI-BEAM RADAR SENSOR

FIELD OF THE INVENTION

The present invention relates to an asymmetrical, multi-beam radar sensor having at least two transmitting and receiving patches.

BACKGROUND INFORMATION

In certain multi-beam radar sensors that have angle evaluation, such as are referred to, for example, in WO 97/02496, the lateral receiving and transmitting paths are arranged so as to be symmetrical with respect to a median plane. In the case of vertical angular detection, the median plane lies in the horizontal direction, and vice versa, in the case of horizontal angular detection, it lies in the vertical direction. For example, due to the preestablished electrical polarization, the three transmitting and receiving patches have the same direction gradient of 45° with respect to the horizontal plane (FIG. 4).

In this context, the two lateral transmitting and receiving patches, with respect to their beam center, are nevertheless arranged symmetrically with respect to the central transmitting/receiving patch. A polyrod (rod radiator) is positioned in the beam path for each patch, the lateral polyrods also being arranged symmetrically with respect to the median plane. For the purpose of further bundling the beam, at least one dielectric lens (antenna lens) is connected on the line side, the lens being configured with respect to its geometry so as to be rotationally asymmetrical or centrally symmetrical.

Also in certain multi-beam methods, in which, in place of the planar transmitting and receiving patches (with or without polyrod or superstrat, a planar dielectric plate which is arranged at a specific distance to the sending/receiving patches), sending/receiving arrangements having junctions to horn radiators are used. In this context, in the beam paths of the horn radiators, dielectric materials can be used for geometry reduction and for further beam bundling. In this method, the non-central beam paths from the source to the furthest exit surface of the radar sensor are also arranged symmetrically with respect to the median plane.

Furthermore, European Patent Application No. 0 498 524 refers to an arrangement for a bistatic radar sensor. As characterized, in this radar sensor, an asymmetry may be achieved as a result of the divided arrangement of the transmitting and receiving paths. However, this asymmetry is compensated for by the overall lateral shift of all of the receiving elements such that the central receiving element electrically attains the central position, and the lateral receiving elements cover the same angles, left and right, with respect to the median plane.

The angles are determined for the radar sensor in accordance with certain methods, such as are referred to, for example, in German Published Patent Application No. 195 43 813 (which corresponds to U.S. Pat. No. 5,966,092).

SUMMARY OF THE INVENTION

In contrast, the multi-beam radar sensor according to the exemplary embodiment of the present invention is believed to have the advantage that improved angle detection results from the asymmetrical radar arrangement.

It is believed to be particularly advantageous that smaller erratic values are obtained for the signal/noise ratio in a given interference-impacted measurement. It is believed that due to the asymmetry of the corresponding scaling (normalization) curves of left and right beam paths, the result advantageously are fewer similar angle patterns, so that measuring deviations exert a smaller influence. It is believed that the consequence should be fewer false angle assignments.

It is also believed to be particularly advantageous that the desired asymmetry of the beam paths is already achieved due to simple alterations in the arrangement geometry of the transmitting/receiving patches with respect to the median plane.

However, an asymmetry of the beam path may also be achieved because the polyrods are arranged at an unequal distance with respect to the median plane.

An unequal angular position relative to the beam path with respect to the median plane of the outer polyrods as well as the different cross-section geometries are also simple measures that are easy to carry out from the point of view of manufacturing engineering and that are also "easy" to check.

Furthermore, it is believed to be expedient to generate an asymmetrical beam path on the basis of appropriate, dielectric materials for the polyrods. In this manner, it is believed that a precise and reproducible design of the arrangement can be executed, which may be realized in a "simple manner" from the point of view of manufacturing engineering.

It is also believed that a further improvement may be achieved because the dielectric lens is asymmetrically configured for the region of the central beam. As a result, the dielectric lens can be manufactured separately so as to have the desired geometry and can then be assembled along with the further elements of the radar sensor. In this manner, it is believed that various sensor types can also be easily accommodated.

On the basis of the radar sensors according to the exemplary embodiments of the present invention, it is believed that a safer and more reliable angle evaluation can be achieved, as may be necessary, for example, in angle or distance measurement in vehicular radar.

BRIEF DESCRIPTION OF THE DRAWINGS

FIG. 3 shows a polyrod mounting support of a symmetrical radar sensor.

FIG. 4 shows asymmetrically arranged polyrods.

FIG. 5 shows asymmetrical polyrods having unequal angular positions.

FIG. 6 shows asymmetrical polyrods having unequal angular positions.

DETAILED DESCRIPTION

Figure 1:
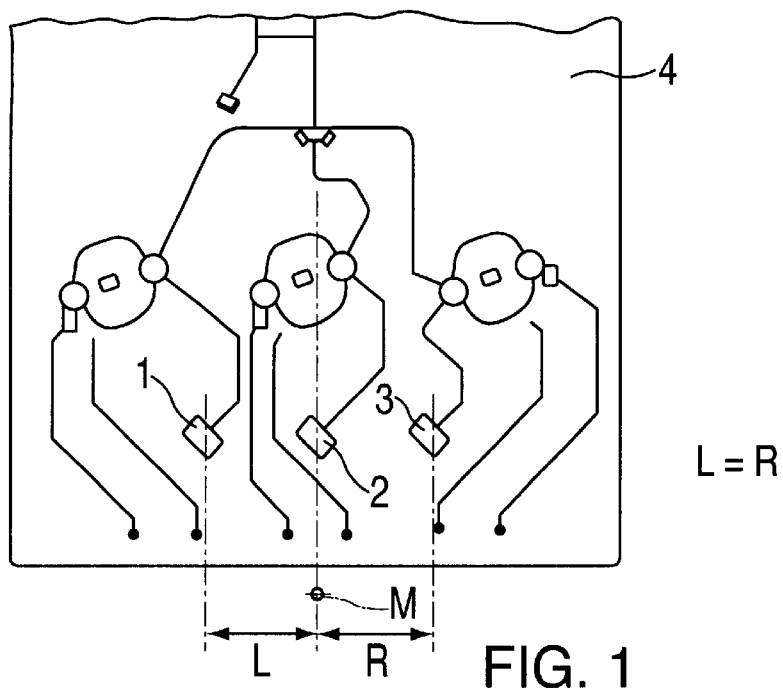
FIG. 1 shows a microwave conductor circuit having three transmitting/receiving patches of an available radar system.

First, the same reference numerals in the individual Figures. refer to the same or corresponding items.

FIG. 1 shows an available circuit arrangement of a microwave conductor having transmitting/receiving patches (hereinafter, referred to as "patches") 1, 2, 3. They are arranged symmetrically with respect to median plane M. Central patch 2 lies on median plane M, distances L, R to outer patches 1, 3 being equal, and the central patch being situated in median plane M.

Figure 2:
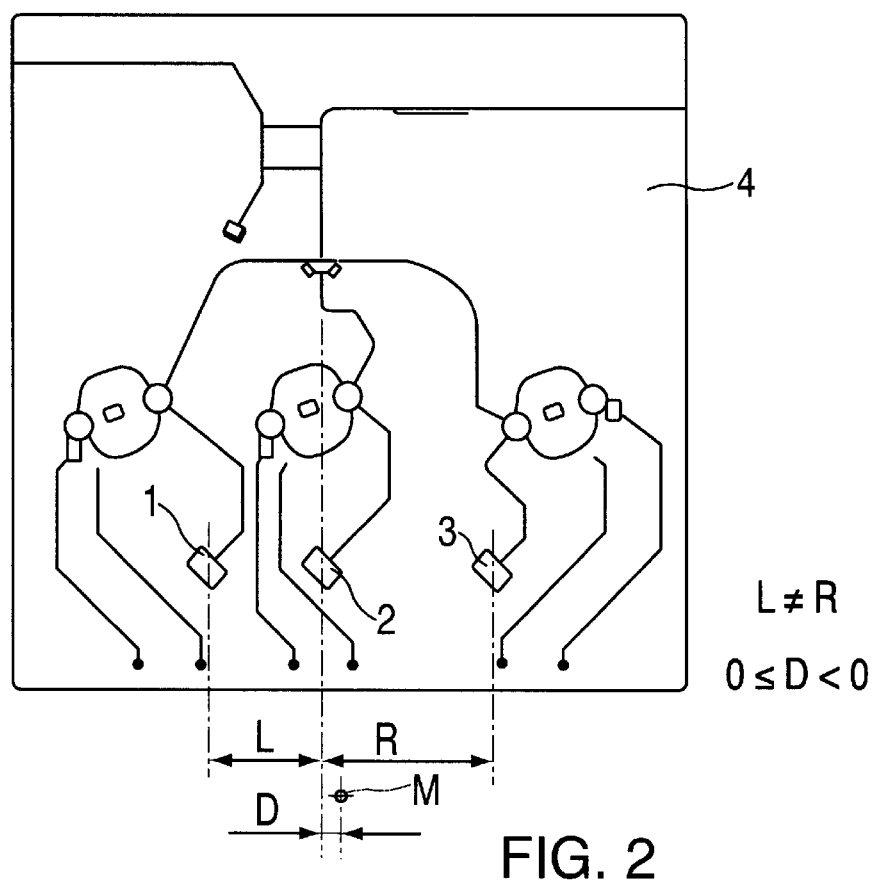
FIG. 2 shows a first exemplary embodiment of asymmetrically arranged transmitting/receiving patches.

FIG. 2 shows a first exemplary embodiment of the present invention, in which outer patches 1, 3 are configured at differing distances L, R from central patch 2. Furthermore, the entire arrangement is shifted to the left by distance D from median plane M. Of course, alternatively, it may be shifted to the right.

FIG. 3 shows an available arrangement of polyrods 6 on a support 5, the distance of polyrods L, R being equal and central polyrod 6 being situated symmetrically on median plane M, which extends vertically over the base area of polyrods 6. Due to the symmetrical arrangement of polyrods 6, the beam paths of the transmitting/receiving beams are symmetrical here.

On the other hand, in the second exemplary embodiment in accordance with FIG. 4, the arrangement of polyrods 6 is asymmetrical, i.e., distance L is smaller than distance R between outer polyrods 6 and central polyrod 6. Furthermore, the entire arrangement is shifted by distance D from median plane M. In this asymmetrical arrangement of polyrods 6, an asymmetrical beam path also results for the transmitting/receiving beam.

FIG. 3, on the other hand, shows a symmetrical arrangement of polyrods 6 of an available radar sensor.

In the third and fourth exemplary embodiments of FIGS. 5 and 6, lateral angles a, b with respect to neighboring polyrods 6 are different. In the third exemplary embodiment in FIG. 5, both left polyrods 6 are arranged so as to be parallel to each other. This yields an angle a=0°. Right polyrod 6 has an angle b>0° with respect to central polyrod 6, because it is tilted laterally.

On the other hand, in the exemplary embodiment in FIG. 6, both angle a as well as angle b between adjoining polyrods 6 are of differing sizes, so that here too asymmetrical beam paths result. For the sake of completeness, it should also be mentioned that polyrods 6 are secured in a support 5, which can be manufactured together with the polyrods, for example, in an injection molding or pressing method.

Figure 7:
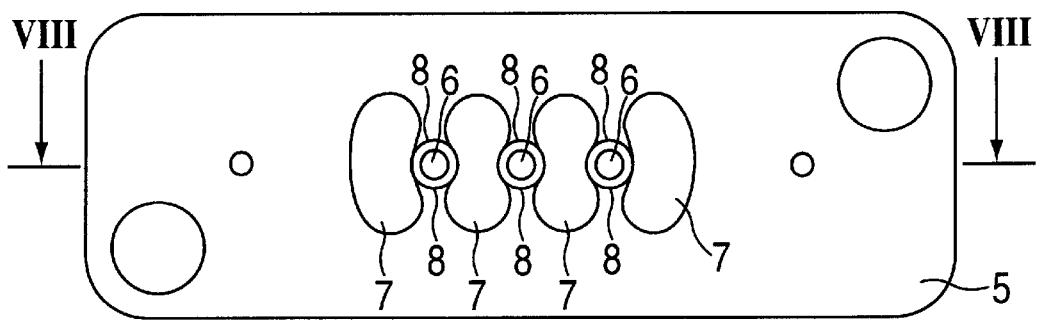
FIG. 7, in a top view, shows available polyrods having a symmetrical cross-section.
Figure 8:
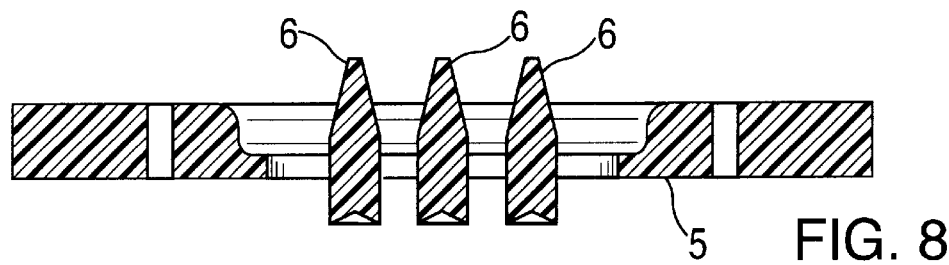
FIG. 8, in a sectional view, shows available polyrods having a symmetrical cross-section.

FIGS. 7 and 8, in a top view (FIG. 7) or in a cutaway view (FIG. 8), show an available embodiment, for arranging polyrods 6 in support 5. Recesses 7 are provided between polyrods 6, so that for support 5, relatively narrow tongues 8 are generated, by which polyrods 6 are fixed in position.

Figure 9:
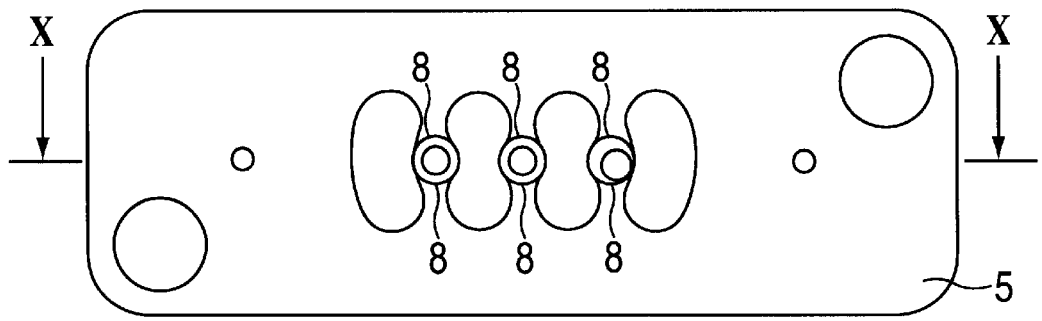
FIG. 9, in a top view, shows a fifth exemplary embodiment having an asymmetrical polyrod cross-section.
Figure 10:
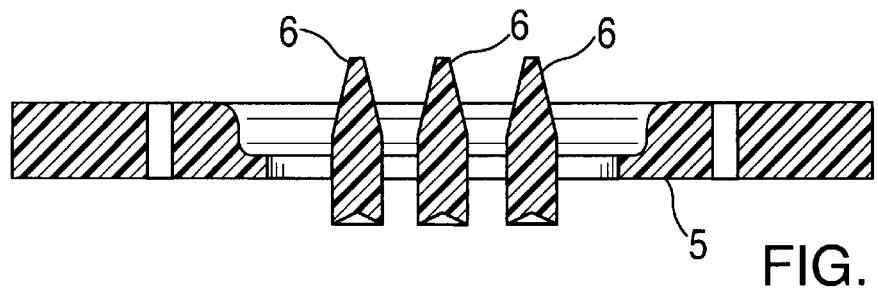
FIG. 10, in a sectional view, shows a fifth exemplary embodiment having an asymmetrical polyrod cross-section.

FIGS. 9 and 10, also in a top view (FIG. 9) and in a cutaway view (FIG. 10), show an arrangement of polyrods 6 on a support 5. However, the arrangement of polyrods 6 is parallel and is configured at equal distances. Nevertheless, polyrods 6 in their cross-section are different. Whereas the cross-section of both left polyrods 6 is symmetrical, the cross-section of right polyrod 6 is configured asymmetrically, a so-called "bended" polyrod. An asymmetrical beam path also results from this asymmetrical embodiment.

An asymmetrical beam path can also be achieved by configuring polyrods 6 using a different dielectric material.

In FIGS. 11 through 16, a sixth exemplary embodiment of the present invention is shown.

FIGS. 6 through 11 show a dielectric lens 9, which acts as an antenna lens and either emits transmission beams or receives reflected beams.

Figure 11:
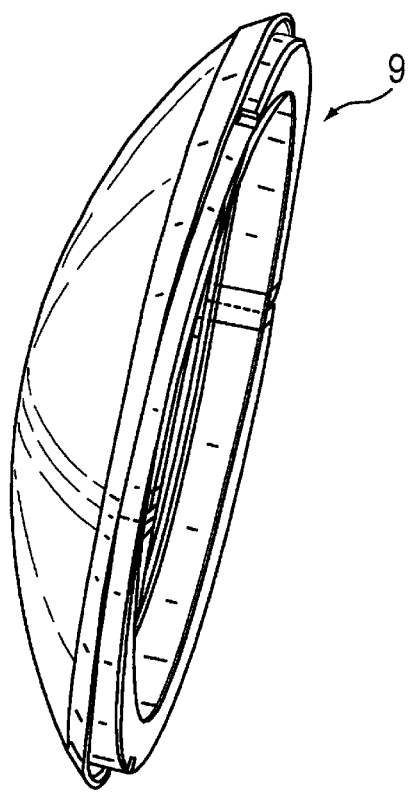
FIG. 11 shows an asymmetrical lens arrangement.

FIG. 11 shows dielectric lens 9 in a three-dimensional representation. Here, the asymmetrical configuration is especially recognizable at the upper and lower edge.

Figure 12:
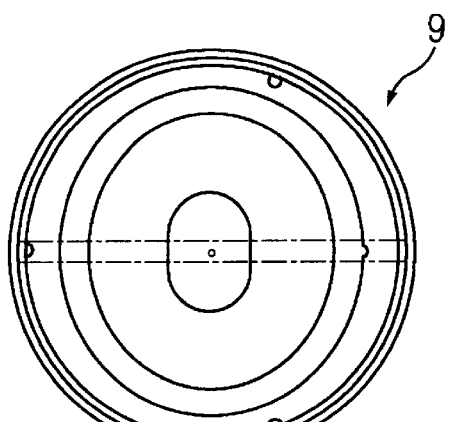
FIG. 12 shows an asymmetrical lens arrangement.

FIG. 12, in a top view, shows dielectric lens 9.

Figure 14:
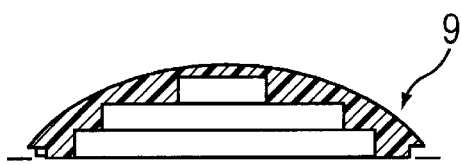
FIG. 14 shows an asymmetrical lens arrangement.
Figure 15:
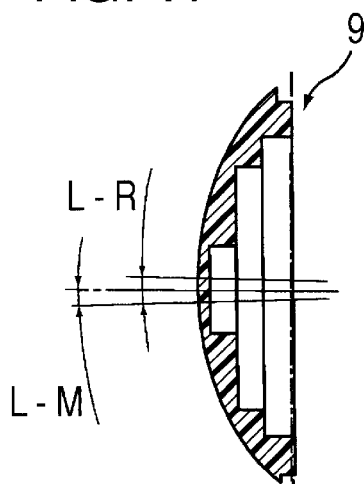
FIG. 15 shows an asymmetrical lens arrangement.
Figure 13:
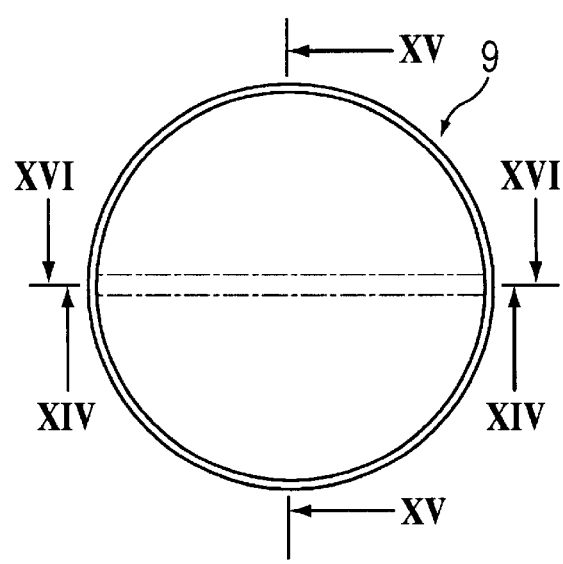
FIG. 13 shows an asymmetrical lens arrangement.
Figure 16:
FIG. 16 shows an asymmetrical lens arrangement.

FIGS. 13 through 16 show dielectric lens 9 (FIG. 13), having sectional drawings S1 and S2, as shown in FIGS. 14, 15, and 16. In the sectional drawings of FIGS. 14, 15, 16, it can be seen that the central line is shifted left-right, or left-center. These shifts are different, so that here too the result is an asymmetry for the central beam path.

The desired asymmetry can also be achieved as a result of the fact that the central beam path is situated outside of median plane M. The distances of the outer beam paths can then be themselves once again symmetrical with respect to median plane M.

The individual exemplary embodiments of the present invention can also be combined with each other. In this context, it is believed to be particularly advantageous to vary dielectric lens 9, because then the other parts of the radar sensor can remain unchanged. In this way, shorter developing times may be achieved than if the other parts, such as the patches and/or the polyrods, were to be adjusted to each other.

In a further exemplary embodiment of the present invention, it is provided to shift the entire transmitting/receiving unit, although without lens 9, vertically with respect to median plane M. In this way as well, asymmetrical beam paths result for the radar beams.

Figure 17A:
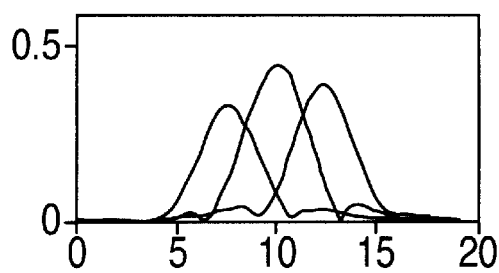
FIG. 17a shows a diagram having angle measurements.
Figure 17B:
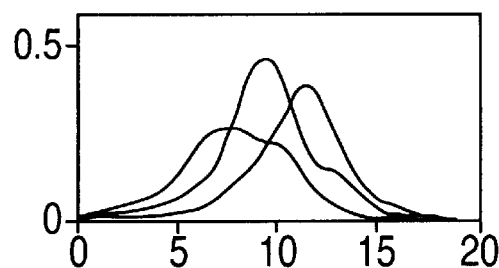
FIG. 17b shows a diagram having angle measurements.
Figure 18A:
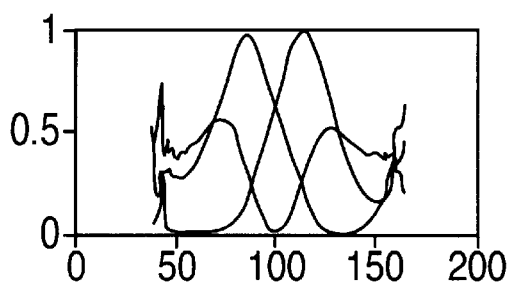
FIG. 18a shows a diagram having angle measurements.
Figure 18B:
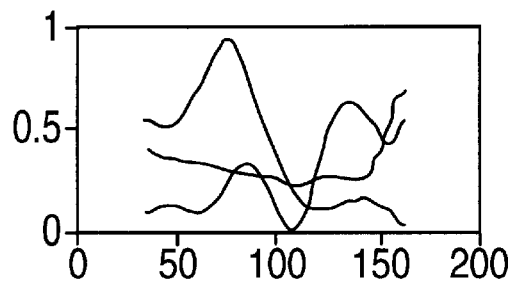
FIG. 18b shows a diagram having angle measurements.
Figure 19A:
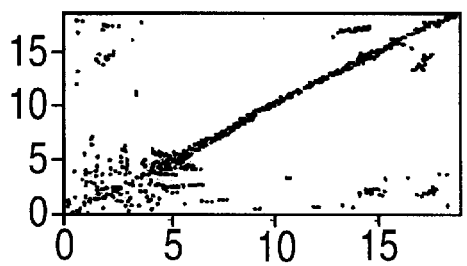
FIG. 19a shows a diagram having angle measurements.
Figure 19B:
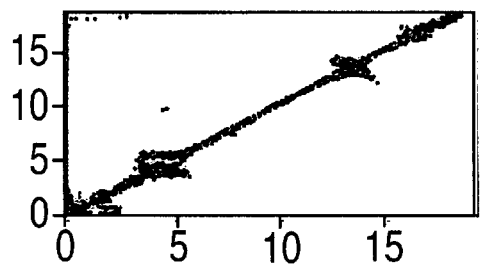
FIG. 19b shows a diagram having angle measurements.

In the following, the mode of operation of the asymmetrical arrangements are discussed in greater detail on the basis of FIGS. 17a through 19b. For comparative purposes, FIGS. 17a, 18a, and 19a show curves of symmetrical arrangements of the radar sensor, whereas FIGS. 17b, 18b, and 19b show curves of asymmetrical arrangements. In FIGS. 17a and 17b, the amplitudes of echo beams are represented, as they were measured by three polyrods 6. As could have been expected, the beam path in the symmetrical arrangement (FIG. 17a) is symmetrical from every polyrod 6. On the other hand, in the asymmetrical embodiment according to the exemplary embodiment of the present invention (FIG. 17b), the individual beams are more or less asymmetrical.

These asymmetries can be recognized even more clearly after the scaling, as represented in FIGS. 18a and 18b. In particular, in FIG. 18b, a marked asymmetry is recognizable. In accordance with available calculating methods, the angle is determined by these curves, many individual measurements being required for the angle evaluation. FIGS. 19a and 19b show diagrams having angle errors, interference-impacted measurements being especially present for the signal/noise ratio, e.g., at 14 dB. Thus on the basis of the measurement results in the symmetrical embodiment (FIG. 19a), an average error amount of 3.146° results.

On the other hand, the error amount of the asymmetrical embodiment according to the exemplary embodiment of the present invention (FIG. 19b) is only 1.977°. It is believed that this is a significant improvement, which may be explained by the fact that as a result of the asymmetry the scaling curves on the left and right sides differ one from each other more than in the case of the symmetrical arrangement. Therefore, there are fewer similar angle patterns. Measuring deviations therefore exert a smaller influence.

What is claimed is:

1. A multi-beam radar sensor comprising:
   at least two transmitting and receiving patches on a support; and
   at least one of assigned polyrods and a dielectric lens;
   wherein the radar sensor is monostatic and is arranged so that at least one of a transmitting beam and a receiving beam has an asymmetrical beam path with respect to a median plane of the radar sensor.

2. The radar sensor of claim 1, wherein the at least two transmitting and receiving patches are arranged at an unequal distance from the median plane.

3. The radar sensor of claim 1, wherein the assigned polyrods are arranged at an unequal distance from the median plane.

4. The radar sensor of claim 1, wherein lateral polyrods of the assigned polyrods are arranged at unequal and lateral angles with respect to the median plane.

5. The radar sensor of claim 1, wherein lateral polyrods of the assigned polyrods have different geometries.

6. The radar sensor of claim 1, wherein lateral polyrods of the assigned polyrods are constructed of different dielectric materials.

7. The radar sensor of claim 1, wherein the dielectric lens is asymmetrical with respect to the median plane for generating an asymmetrical central beam.

8. The radar sensor of claim 1, wherein an arrangement of a central polyrod of the assigned polyrods and at least one of the at least two transmitting and receiving patches is shifted with respect to the dielectric lens so that a central beam path lies outside of the median plane.

9. The radar sensor of claim 1, wherein the at least two transmitting and receiving patches having the assigned polyrods relative to the dielectric lens are laterally shifted with respect to median plane.

10. The radar sensor of claim 1, wherein the radar sensor is arranged on a motor vehicle and is configured for evaluating an angle.

* * * * *